United States Patent [19]

Vogel

[11] Patent Number: 4,521,363
[45] Date of Patent: Jun. 4, 1985

[54] EXTRUSION OF A PLASTIC COATING ABOUT A STRAND

[75] Inventor: Ralph A. Vogel, Three Rivers, Mich.

[73] Assignee: Essex Group, Inc., Fort Wayne, Ind.

[21] Appl. No.: 573,172

[22] Filed: Jan. 23, 1984

[51] Int. Cl.³ ............................................. B29F 3/10
[52] U.S. Cl. ................................... 264/174; 425/114; 425/462; 427/120; 428/379
[58] Field of Search ............... 264/174; 425/114, 113, 425/462; 427/120; 428/379

[56] References Cited

U.S. PATENT DOCUMENTS

| | | | |
|---|---|---|---|
| 2,859,476 | 11/1958 | Lainson | 425/462 |
| 2,863,171 | 12/1958 | Von Bergen | 425/114 |
| 2,893,056 | 7/1959 | Henning | 425/113 |
| 2,902,083 | 9/1959 | White | 425/114 |
| 3,758,247 | 9/1973 | Deegen | 425/114 |
| 3,813,199 | 5/1974 | Friesner | 425/113 |
| 3,860,686 | 1/1975 | Myers | 264/174 |
| 4,145,474 | 3/1979 | Kertscher et al. | 428/379 |
| 4,165,957 | 8/1979 | Kertscher | 425/113 |
| 4,208,175 | 6/1980 | Rosenbaum | 425/462 |
| 4,280,801 | 7/1981 | Wheeler et al. | 425/113 |
| 4,295,812 | 10/1981 | Hoddinott | 425/114 |
| 4,379,102 | 4/1983 | Kertscher | 264/40.7 |
| 4,397,624 | 8/1983 | Haverkamp et al. | 425/113 |

FOREIGN PATENT DOCUMENTS

| | | | |
|---|---|---|---|
| 538698 | 7/1959 | Belgium | 425/113 |
| 1118265 | 3/1956 | France | 425/113 |

*Primary Examiner*—Jeffery Thurlow
*Attorney, Agent, or Firm*—Robert D. Sommer

[57] ABSTRACT

An apparatus and method for extruding a thin uniform coating of fluent plastic material about a continuously advancing strand wherein the fluent plastic material is directed radially toward the strand through a constricted annular feed passage. The strand with the fluent plastic material adhering thereto is then advanced through a passageway conically converging to an exit end and effective to develop hydrodynamic pressure forces which center the strand within the passageway.

5 Claims, 4 Drawing Figures

EXTRUSION OF A PLASTIC COATING ABOUT A STRAND

BACKGROUND OF THE INVENTION

This invention relates generally to the extrusion of a plastic coating about a strand, and more specifically relates to an improved apparatus and method for extruding a thin uniform coating of plastic material about a strand, as in the production of magnet wire.

Film insulated magnet wire is conventionally manufactured by applying a solution of a synthetic resin in organic solvents to a small diameter wire and then passing the coated wire through an oven wherein the coating is baked. The application of multiple layers of resin is required to obtain a coating which meets the exacting magnet wire standards of thickness, concentricity, uniformity and surface quality.

The manufacture of magnet wire by extruding molten plastic around a wire as single layer coating has been suggested in U.S. Pat. Nos. 4,145,474, 4,165,957 and 4,379,102. The extrusion die assembly shown in the latter two patents is of a somewhat complicated and expensive construction. Because of the numerous sizes of magnet wire produced, die assemblies of this construction require a substantial investment.

SUMMARY OF THE INVENTION

The present invention provides an apparatus and method for extruding a thin uniform coating of fluent plastic material about an advancing strand wherein a radial stream of the plastic material is directed radially inwardly through a constricted annular feed passage onto the advancing strand as it emerges from a guide member. The strand with the fluent plastic material adhering thereto is immediately passed through a conically converging passageway in a die member to create an annular wedge-shaped stream of plastic material about the strand which develops hydrodynamic pressure forces effective to center the strand in the annular stream of plastic material.

For a better understanding of the invention, reference may be had to the follwing detailed description taken in connection with the accompanying drawings, in which:

DETAILED DESCRIPTION OF THE INVENTION

Figure 1:
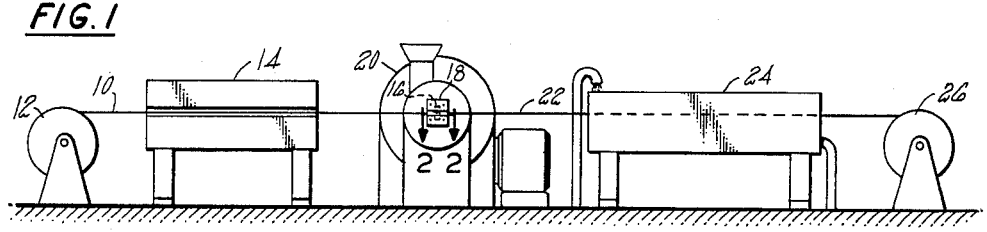
FIG. 1 is a diagrammatic elevation of strand coating apparatus comprising an embodiment of this invention.

Referring to the drawings, FIG. 1 shows diagrammatically an apparatus for extruding a thin uniform coating of fluent plastic material on a strand 10 such as a solid round wire of copper or aluminum. The strand 10 is supplied from a reel 12 or any other suitable supply source such as a conventional wire drawing apparatus and passes through a heater 14 which can be electrically energized or gas-fired. The heater 14 is operated to heat the strand 10 to a temperature which is substantially equal to the extrusion temperature of the plastic material coating which is to be applied onto the strand 10.

The heated strand 10 is advanced longitudinally through an extrusion die assembly 16 mounted in the head 18 of an extruder 20. Fluent plastic material 22 forced by the extruder 20 into the die assembly 16 is extruded to form a thin uniform coating about the moving strand 10. The construction of the die assembly 16 which forms an important feature of this invention is hereinafter described. The coated strand 10 emerging from the die assembly 16 is passed through a cooling tank 24 where the coating of plastic material is cooled by water to substantially room temperature so that the coated strand 10 may then be wound onto a take-up reel 26 or the like. If the strand 10 is to be coated with a thermosetting rather than thermoplastic material, then the coated strand 10 emerging from the die assembly 16 is first passed through a curing oven (not shown) where the coating is cured by heating to effect cross-linking of the plastic material.

Figure 2:
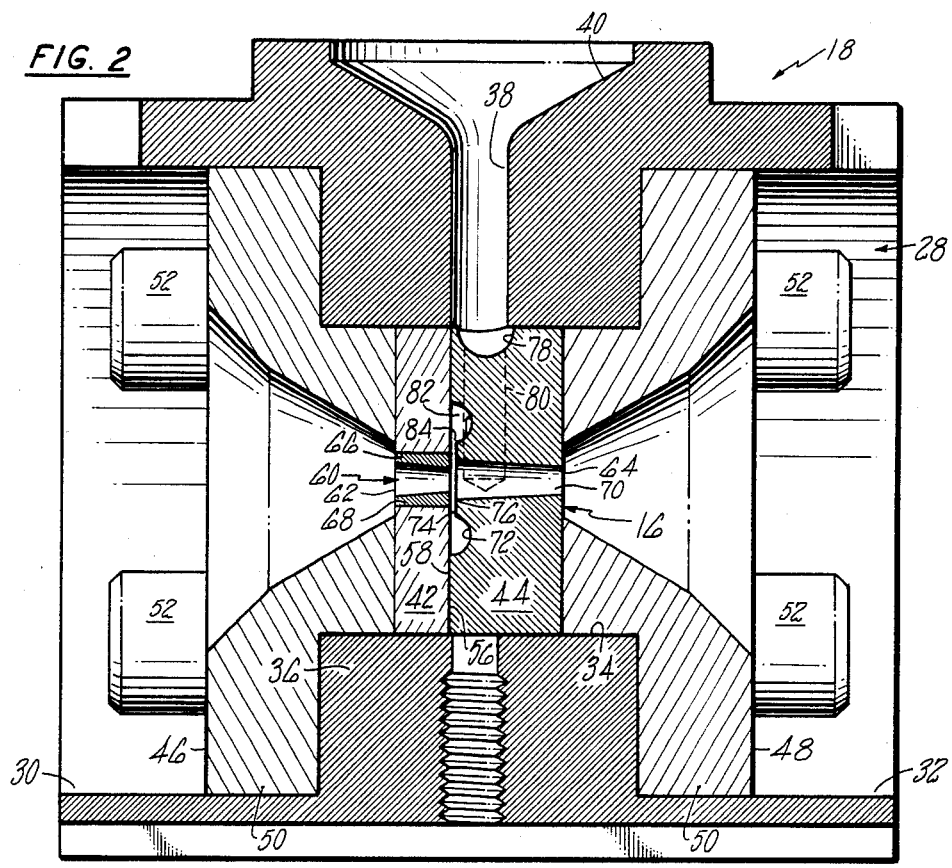
FIG. 2 is an enlarged sectional view of the extruder head of the apparatus of FIG. 1.
Figure 3:
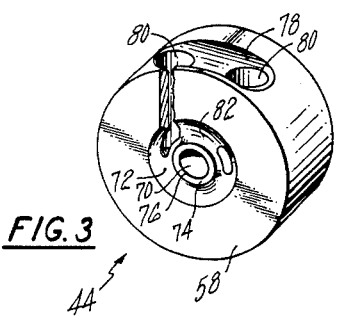
FIG. 3 is a partially broken away perspective view of the die member of the extruder head of FIG. 2.

Referring to FIG. 2, the extruder head 18 is shown as having a longitudinal extrusion passage 28 therethrough which includes counterbores 30 and 32 at its respective ends and a smaller cylindrical bore 34 extending through an annular shoulder 36 formed by the counterbores. A feed port 38 communicating with the bore 34 has a tapered inlet opening 40 into which fluent plastic material 22 is forced by the extrusion cylinder of the extruder 20. A die assembly comprising a wire guide member 42 and an extrusion die member 44 is held within the bore 34 by means of end plates 46 and 48 having end flanges 50 which are fastened to the head 18 by bolts 52. Each of the end plates 46 and 48 has an opening therethrough which is preferably flared.

The guide member 42 and the die member 44 are each in the form of a circular flat plate or disc with an outer peripheral surface sized to fit closely with the bore 34. The confronting faces 56 and 58 of the members 42 and 44, respectively, have plane lateral surfaces in abutting engagement. Formed in the members 42 and 44 is a longitudinally extending continuous bore 60 through which the strand 10 travels from an entry end 62 to an exit end 64. A portion of the bore 60 adjacent the entry end 62 is defined by a guide bushing 66 of hard, wear-resistant material fixed in a cylindrical central bore 68 of the guide member 42 with its outlet end substantially flush with the face of the member 42. The bushing 66 is dimensioned for a close radial clearance over the strand 10 and guides the advancing strand to the axial center of the exit end portion of the bore 60. This exit end portion is defined by a central passageway 70 extending through the die member 44 in alignment with the entry end portion defined by the bushing 66. The passageway 70 is conically convergent toward the exit end 64 of the bore 60 at a small included angle in the range of about 0.5° to 8°.

The die member 44 is provided with a circumferential channel 72 in its face 58 which is spaced from and coaxial with the passageway 70. Also formed in the face 58 is a relatively shallow depression 74 extending radially inwardly from the channel 72 to the larger end 76 of the passageway 70. The outer periphery of the die member 44 is formed with an elongated arcuate cavity 78 having a longitudinal axis generally perpendicular to the longitudinal axis of the passageway 70. Two identical parallel supply passages 80 chordally formed in the die member 44 extend from respective opposite ends of the cavity 78 to communicate with the channel 72 at circumferentially spaced locations.

The guide member 42 and the die member 44 are assembled in abutting relation within the bore 34 of the head 18 with the central portion of the cavity 78 aligned and in communication with the feed port 38. An annular distribution chamber 82 concentric with the bore 60 is formed between the channel 72 of the die member 44 and the face 56 of the guide member 42. A constricted annular feed passage 84 is formed between the depression 74 and the confronting portions of the face 56 and the bushing 66. The feed passage 84 is of substantially uniform annular width and length and extends radially inward from the distribution chamber 82 to a portion of the bore 60 intermediate the outlet of the bushing 66 and the larger end 76 of the passageway 70.

In the operation of the improved die assembly, the strand 10 is advanced longitudinally through the bore 60 in the members 42 and 44 while fluent plastic material 22 such as molten polyethylene terepthalate is forced under pressure into the feed port 38 in the head 18. A stream of plastic material 22 flows into the cavity 78 and is divided into equal branch streams flowing through the supply passages 80. The two separate branch streams of plastic material emerge from the passages 80 into the distribution chamber 82 at circumferentially spaced points and combine to form an annular pool of plastic material 22. A radial stream of plastic material is directed radially inward from this pool into the bore 60 through the constricted annular feed passage 84. As the quantity of plastic material flowing through the constricted feed passage 84 is relatively small compared to the volume of the distribution chamber 82, the pool of plastic material within the distribution chamber is maintained at a substantially uniform pressure therethrough. Thus, there is a symmetrical or substantially uniform flow of plastic material through the feed passage 84.

The radial stream of plastic material directed through the feed passage 84 comes into intimate contact with the moving surface of the strand 10 as it emerges from the bushing 66. The continuous advancement of the strand 10 through the bore 60 tends to drag the fluent plastic material 22 into the conically coverging passageway 70. The clearance of the frustro-conical inner surface of the passageway 70 over the moving strand 10 results in the formation of an annular wedge-shaped stream of plastic material 22 within the passageway 70. The hydrodynamic forces developed by this wedge-shaped stream act to center the strand 10 within the passageway 70. As a result thereof, the strand 10 emerges from the exit end 64 of the passageway 70 well-centered within a coating of plastic material 22 that is of uniform thickness. The outside diameter of the coated strand is determined by the size of the exit end 64.

Figure 4:
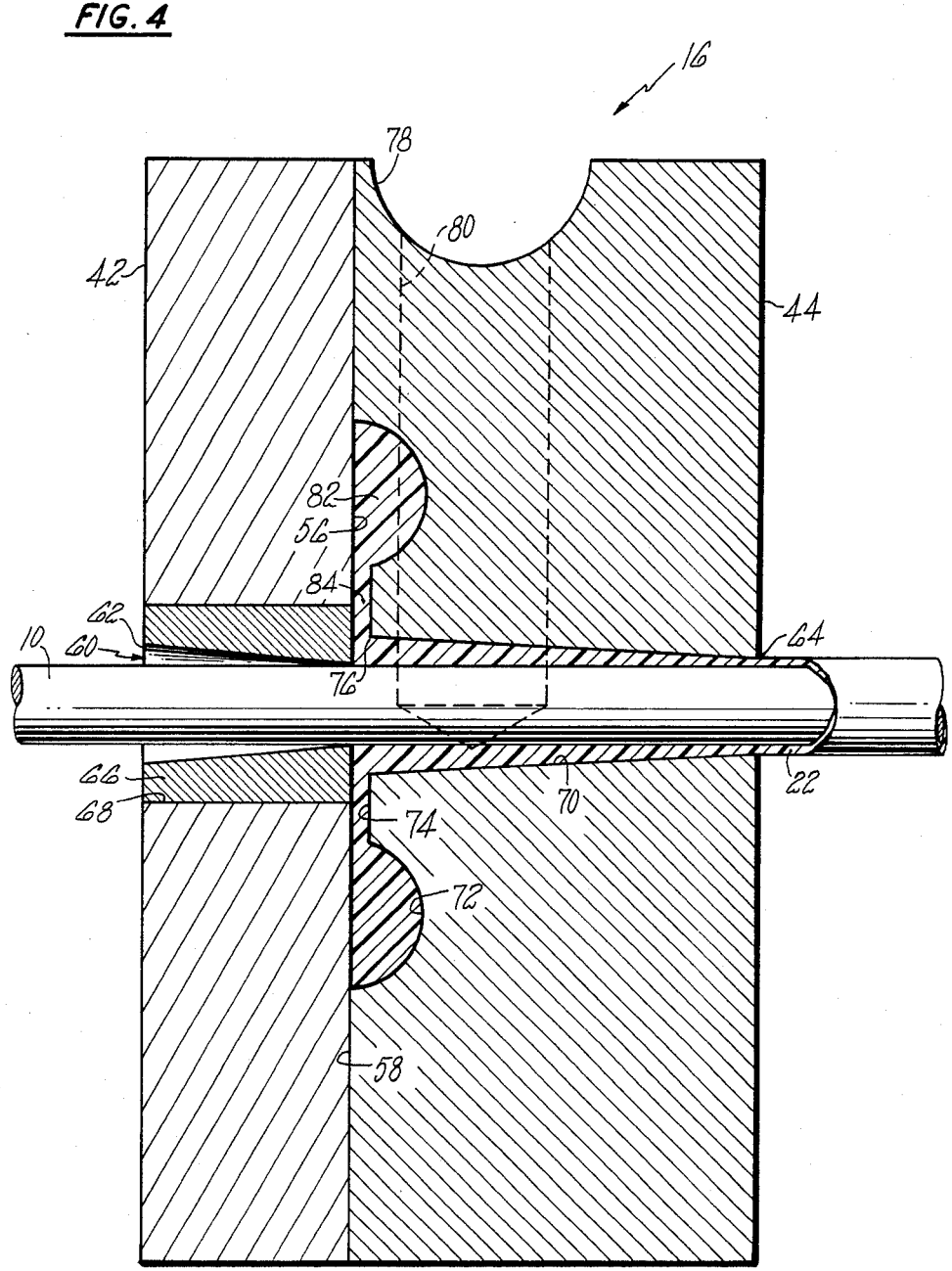
FIG. 4 is a sectional view on a further enlarged scale of the die assembly of the extruder head of FIG. 2.

Referring to FIG. 4, it will be seen that the portion of the bore 60 intermediate the outlet end of the bushing 66 and the larger end 76 of the passageway 70 has an axial length substantially equal to the annular width of the feed passage 84. The plastic material 22 thus flows through the feed passage 84 and onto the advancing strand 10 as a radially converging stream of thin cross section with no substantial change in velocity. This minimizes the development of shear stress so as to avoid melt fracture which could affect the smoothness and density of the coating of plastic material on the strand emerging from the die member 44.

In a typical die assembly for coating a round copper wire of 0.040 inch diameter with polyethylene terepthalate, the guide member 42 and the die member 44 have equal external diameters of one inch and respective axial lengths of 3/16 and ⅜ inch. The bore extending through the guide bushing 66 is conically convergent toward its outlet end at an included angle of about 16° and has a clearance of about 0.001 to 0.002 inch over the copper wire. The channel 72 in the face 58 of the die member 44 has a mean diameter of 11/32 inch and is formed with a 3/32 inch diameter cutter to a depth of 1/16 inch. The depression 74 has a depth of 0.012 inch. The passageway 70 has a total cone angle of 3° and at the exit end has a diameter of 0.043 inch. In the use of this die assembly, the copper wire is preheated to a temperature of 500° F. prior to its entry into the die assembly and is advanced through the die assembly at a rate of about 1000 feet per minute. The polyethylene terepthalate is supplied to the die assembly at a temperature of 575° F. and a pressure of 800 psi. An accurately centered coated wire having a diameter of 0.043 inch is produced with a smooth coating.

Other extrudable material usable as coatings may be applied with the apparatus and method of this invention. In the manufacture of magnet wire, these materials include acrylics, epoxies, polyamide-imides, polyesters, polyesterimides, polyamides, polyimides, polysulfones and polyurethanes. Such coatings in thicknesses of about 0.001 to 0.004 inch may be applied to wires of diameters in the range of 0.008 to 0.08 inch at the rate of about 100 to 1400 feet per minute.

From the foregoing description, it will be seen that the present invention affords an apparatus and method of applying fluent plastic material to a continuously advancing strand in a thin layer having a high degree of concentricity to provide a coating of uniform thickness. The die assembly of the invention is simple in construction, is easy to clean and permits easy insertion of a strand therein during a start-up operation.

While there has been described above the principles of this invention in connection with specific coating apparatus, it is to be understood that this description is made only by way of example and not as a limitation to the scope of the invention.

What is claimed is:

1. In an apparatus for extruding a thin uniform coating of fluent plastic material about a moving strand advancing longitudinally through a die assembly into which a stream of fluent plastic material is forced by an extruder, the improvement wherein said die assembly comprises:

a guide member and an extrusion die member in axially aligned relation with a longitudinally extending continuous bore formed therein through which the moving strand travels from an entry end to an exit end;

the portion of said bore adjacent said entry end being located within said guide member and dimensioned to serve as a guide for moving strand traveling longitudinally through said bore;

the portion of said bore adjacent said exit end being located within said die member and being in the form of a frustrum of a cone with its smaller end at said exit end and its larger end proximate to and in communication with said entry end portion; said exit end being of a size providing a clearance of from about 0.001 to 0.004 inch on the diameter of the moving strand; the frustro-conical inner surface of said exit end portion extending over a length substantially greater than the diameter of the moving strand and being tapered at an included angle of from about 0.5° to 8°; the clearance of said inner surface over the moving strand defining a hydrodynamic pressure centering chamber to cause the plastic material carried by the moving strand to develop hydrodynamic pressure forces effective to maintain the moving strand centered within said exit portion;

a circumferential channel proximate to said guide member which is spaced from and coaxial with said bore to define an annular distribution chamber concentric with said bore;

supply passages of substantially equal lengths leading to circumferentially spaced locations in said distribution chamber for feeding said distribution chamber with plastic material from an extruder; and a constricted annular feed passage of uniform annular width and length extending radially inward from said distribution chamber to a portion of said bore intermediate the outlet of said entry end portion and the larger end of said exit end portion to direct a thin cross section of the plastic material radially inward onto the moving strand with substantially uniform volumetric flow of the plastic material circumferentially of the moving strand; the axial length of said intermediate bore portion being not substantially greater than the annular width of said feed passage thereby minimizing the application of shear stress to the plastic material which is directed onto the moving strand.

2. The improvement of claim 1 wherein said guide member and said die member have respective plane lateral surfaces in abutting engagement; said die member surface being recessed to form with the confronting guide member surface said distribution chamber and said feed passage.

3. The improvement of claim 2 including an elongated cavity formed in an external surface of said die member which receives the plastic material from an extruder; the longitudinal axis of said cavity being generally perpendicular to the longitudinal axis of said bore exit end portion; said supply passages being formed in said die member and extending from opposite ends of said cavity to said respective circumferentially spaced locations in said distribution chamber.

4. The improvement of claim 3 wherein said bore entry end portion is defined by a guide bushing of hard wear-resistant material fixed to said guide member; the outlet end of said guide bushing being flush with said guide member surface.

5. A method of extruding a thin uniform coating of fluent plastic material about a strand advancing longitudinally through a die assembly into which a stream of fluent plastic material is forced, said method comprising the steps of:

continuously advancing said strand at a constant speed through an entry end portion of a continuous bore formed in a die assembly; said entry end portion being dimensioned to serve as a guide for the advancing strand;

forcing a stream of fluent plastic material into said die assembly;

dividing said stream of fluent plastic material into equal branch streams;

directing said branch streams to circumferentially spaced points in an annular distribution chamber within said die assembly which is spaced from and concentric with said bore;

combining said branch streams within said distribution chamber to form an annular pool of fluent plastic material of substantially uniform pressure therethrough;

directing a radial stream of fluent plastic material from said distribution chamber radially inward and onto the advancing strand through a constricted annular feed passage of uniform compass extending between said distribution chamber and an intermediate portion of said bore at the outlet of said entry end portion, thereby providing a symmetrical flow of the fluent plastic material onto the advancing strand; and passing the advancing strand with the radial stream of fluent material adhering thereto through a conically converging exit end portion of said bore which is convergent toward the exit end of said bore at an included angle of from about 0.5° to 8°, thereby effecting a hydrodynamic circumferential centering action upon the fluent plastic material adhering to the advancing strand which centers the latter within said exit end portion.

* * * * *